(12) United States Patent
Barthold

(10) Patent No.: US 8,471,416 B2
(45) Date of Patent: Jun. 25, 2013

(54) IN SITU RECONSTRUCTION OF HIGH VOLTAGE ELECTRIC POWER LINES

(76) Inventor: Lionel O. Barthold, Lake George, NY (US)

( * ) Notice: Subject to any disclaimer, the term of this patent is extended or adjusted under 35 U.S.C. 154(b) by 645 days.

(21) Appl. No.: 12/474,699

(22) Filed: May 29, 2009

(65) Prior Publication Data
US 2009/0295235 A1 Dec. 3, 2009

Related U.S. Application Data

(60) Provisional application No. 61/056,950, filed on May 29, 2008.

(51) Int. Cl.
*H01B 7/30* (2006.01)
*H01B 11/02* (2006.01)
*H02B 1/20* (2006.01)
*H02G 5/06* (2006.01)

(52) U.S. Cl.
USPC .......................................... 307/147; 307/151

(58) Field of Classification Search
USPC .......................................... 307/147, 149, 151
See application file for complete search history.

(56) References Cited

U.S. PATENT DOCUMENTS

| | | | |
|---|---|---|---|
| 4,421,301 A | 12/1983 | Chapman | |
| 4,487,395 A | 12/1984 | Despins | |
| 4,494,732 A | 1/1985 | Waymire | |
| 5,414,612 A | 5/1995 | Bjorklund et al. | |
| 6,434,810 B1 | 8/2002 | Pigott et al. | |
| 7,535,132 B2 * | 5/2009 | Devine et al. | 307/147 |
| 2006/0016616 A1 | 1/2006 | Goldsworthy et al. | |
| 2008/0172873 A1 | 7/2008 | Goldsworthy et al. | |

FOREIGN PATENT DOCUMENTS

WO WO2007028350 * 3/2007

OTHER PUBLICATIONS

B Kumar, "Electrical Insulation Conference" Sep. 1997 p. 481-483 "SMUD averted a major outage by using the largest mobile transformation built with high temperature insulation".*

* cited by examiner

*Primary Examiner* — Carlos Amaya
(74) *Attorney, Agent, or Firm* — Brian M. Dingman; Dingman IP Law, PC

(57) ABSTRACT

A method for creating working space for construction of a new high-voltage transmission line within an existing three phase high voltage transmission right of way without removing the existing three-phase high voltage transmission line already occupying that right of way from service. The method includes removing the voltage applied to one phase of the existing transmission line, continuing to transmit power on the conductors comprising the remaining phases, and installing new support structures and their associated conductors on the right of way while the existing transmission line continues to operate.

12 Claims, 22 Drawing Sheets

IN SITU RECONSTRUCTION OF HIGH VOLTAGE ELECTRIC POWER LINES

CROSS REFERENCE TO RELATED APPLICATION

This application claims priority of Provisional Application Ser. No. 61/056,950, filed on May 29, 2008. The entire contents of this prior application are incorporated herein by reference.

FIELD OF THE INVENTION

This invention relates to a method and apparatus for building new high voltage higher capacity transmission lines on rights of way presently occupied by older transmission lines of limited capacity.

BACKGROUND OF THE INVENTION

Over the last fifty years, growth in electrical demand and in generating capacity has far outpaced the construction of transmission lines to carry that power from the point of generation to the point of demand. The shortfall in transmission capacity has been due both to public antipathy to opening of new electric power transmission rights of way and construction of new transmission lines and to changes in incentive structure caused by deregulation of the electric power industry.

In response to the shortage of transmission capacity the industry has (a) developed equipment for better allocating the flow of electricity among alternative transmission paths, (b) basing current ratings on weather conditions prevailing at the time of electrical loading, (c) developed conductors which, for the same size and weight, can be operated at higher current levels and higher temperatures and (d) developed methods for replacing older conductors with those of higher rating and doing so without interrupting operation of the circuit begin upgraded.

The above measures notwithstanding, many of the structures which support today's high voltage transmission lines are well beyond their design life and in need of replacement. Even structures in good condition are mechanically unable to accommodate larger conductors necessary to make major increases in the current-carrying capacity of lines.

The foregoing create a strong incentive for building new, higher capacity transmission lines on existing rights-of-way. New lines of higher voltage, using modern structure designs and consisting of two rather than one circuit may increase the transfer capability of an old right of way by as much as ten to one.

Unfortunately those transmission paths where the need for increased transmission capacity is the greatest, are also the paths where removing the existing line from service to allow construction is difficult or impossible. The only remaining option is to build a new line while the old one remains in service; either permanently or until the old can be replaced by the new.

Rights of way are normally too narrow to allow safe construction of a new transmission line alongside the old while the latter is still operating; hence the need for methods and equipment which can provide space sufficient for safe construction of new structures while an existing line continues to operate. The invention described herein addresses that need.

While those versed in the art will recognize applicability and extension of the invention to other types of transmission line support structures, this description will focus on an "H-frame" structure, typical of many 115 kV, 138 kV and 230 kV transmission lines throughout the world. Such a structure 1 (prior art) is illustrated in FIG. 1 and usually consists of two upright wooden poles 2 which support a cross arm 3 from which three strings of insulators 4 are suspended, one for each of three phase conductors 6 used in conventional high voltage power transmission. The structure is normally reinforced by an X brace 5. A small "shield wire" 7 is normally attached to the top of each pole 2 to intercept lightning strokes.

In FIG. 1 the phase positions are labeled a, b, and c. Individual structures of the type shown in FIG. 1 are separated by a distance which may vary from several hundred to over a thousand feet. The conductor 6, being suspended at each structure 1 forms a catenary between structures, the lowest point of which, shown as a', b', and c' in FIG. 1, will be at the center of the "span" between structure s on perfectly level terrain. In FIG. 1 *a* and *a'*, *b* and *b'*, as well as *c* and *c'* are linked by a dashed line. FIG. 2 (prior art) shows a longitudinal view of such a span.

SUMMARY OF THE INVENTION

This invention features a method and apparatus for building new high voltage higher capacity transmission lines on rights of way presently occupied by older transmission lines of limited capacity. The inventive method comprises two broad steps, the first of which uses temporary electric substations or other devices at each end of the old transmission line to convert the method of power transmission on that line to a method which allows one of three phase conductors to be connected to ground, thereby allowing construction work in close proximity to that phase conductor. The second consists of a method and equipment necessary to move the remaining two phase conductors away from the grounded conductor at the point of construction, thereby allowing space sufficient for construction purposes.

The invention creates workspace, preferably at or near the center of a span, between two high voltage transmission support structures to safely assemble and erect a new support structure while the original transmission line continues operation. The workspace may be created either at the center of the right of way, or towards either side of the right of way. The boundaries of that workspace must be far enough from energized conductors 6 shown in FIG. 1 to provide safe working space as defined by a number of industry standards and operating procedures.

Workspace can be substantially increased by converting the form of power transmission to a form which permits either removing one of the three existing phase positions or connecting one phase position to ground; thus eliminating proximity to that conductor as a limitation in workman's safety. In one embodiment, one phase is simply disconnected and either removed or grounded. The imbalance that would normally result from two rather than three-phase operation is mitigated by temporary addition of reactive power compensation devices to the line occupying the right of way to be upgraded and/or in lines which are electrically parallel to it. A second embodiment causes the transmitted electricity to be sent through a temporary auxiliary ac substation before it is attached to the line in question and, at the remote end, to pass through an identical auxiliary ac substation before it is delivered to the permanent substation receiving power. A third embodiment uses an auxiliary substation in much the manner as the second, but converts electricity from three phase ac power into two pole (bipole) dc power which needs only two conductors to function; one positive and one negative.

Any of the foregoing embodiments may be used to transmit substantially the same level of power carried by the line prior to the construction undertaking.

This invention also features a procedure and apparatus capable of moving one or more live conductors (6 in FIG. 1) away from other conductors at or near the midpoint between adjacent transmission structures so as to provide space for construction of a new transmission structure at that point. Once a new structure is built, the position of live conductors on the existing line remains constrained to a safe distance from the new structure while construction of a new structures on other spans is undertaken. It may be possible to increase the span of the new circuit to the point where construction need only be undertaken in alternate spans of the existing power transmission line.

The invention includes a method for creating working space for construction of a new high-voltage transmission line within an existing three phase high voltage transmission right of way without removing the existing three-phase high voltage transmission line already occupying that right of way from service, the method comprising removing the voltage applied to one phase of the existing transmission line, continuing to transmit power on the conductors comprising the remaining phases, and installing new support structures and their associated conductors on the right of way while the existing transmission line continues to operate.

Temporary, transportable substations can be installed on the right of way at each terminal of the existing transmission line to control its mode of power transmission. The temporary, transportable substations can change the mode of ac transmission to one which allows the existing transmission line to transmit power while the conductor serving one of its former three phases is grounded. The method may further comprise mitigation of the imbalance in the two phases that continue to transmit ac power by the use of electrical devices electrically coupled to those two phases. The method may further comprise use of electrical devices to adjust the ac power flow on the two phases of the existing transmission line that remain in service. The mode of electric power transfer on the remaining two phase positions can be changed to two-pole direct current by insertion of a temporary ac-to-dc converter station at one end of the existing transmission line and a temporary dc-to-ac converter station at the other end; thus allowing the conductor formerly constituting the third phase to be grounded.

The method may further comprise moving the conductors of the remaining two phases or dc pole positions laterally. Moving the conductors of the remaining phases or pole positions laterally may be accomplished at or near the midpoint between support structures to allow space for new transmission line support structures. The lateral displacement may be achieved by the separate or combined use of hot sticks, insulators, and extendable insulated props, thus increasing the available space for the new structures. The clearance between live conductors suspended from existing structures and newly erected structures may be maintained by leaving in place hot sticks or insulators used for lateral displacement of live conductors at each existing structure until the high voltage transmission line supported by new structures is commissioned and the existing structures are taken out of service.

The invention also features an extendable insulated prop or system of props capable of lifting existing conductors at or near the midpoint between existing support structures and exerting lateral force sufficient to move them away from a work area. The base point and length of the insulated prop may be adjustable to maximize the lateral displacement of an existing conductor while respecting force constraints safe for the existing structure and while not affecting the sag on adjacent spans. One or more insulated props may be vehicle mounted.

The invention further features a boom-mounted device for aiding in the capture and holding of overhead conductors without the need for clamps.

BRIEF DESCRIPTION OF THE DRAWINGS

Other objects, features and advantages will occur to those skilled in the art from the following description of the preferred embodiments of the invention, and the accompanying drawings, in which like numbers are used for like parts, and wherein.

DESCRIPTION OF THE PREFERRED EMBODIMENTS

The first broad step of the inventive method is to reconfigure an existing three-phase circuit carried in the right of way of interest, such that one of the three phase conductors is connected to ground while the circuit continues to operate over the other conductors. Three embodiments to accomplish these results are described, although the invention is not limited to these embodiments.

First Example Embodiment: Operation with One Phase Out of Service

Disconnecting one of three phases transmitting ac power while leaving two intact will normally create an unacceptable electrical imbalance in system currents and voltages. It has recently been shown that this imbalance can be minimized by the inserting series and shunt reactive power compensation in transmission lines which are electrically in parallel with the line that operates in a two-phase mode (see Richard J. Marceau, Abdou-R. Santa, and Donald T. McGillis, "Asymmetric Operation of AC Power Transmission Systems," Presses Internationales Plytechnique, 2006, ISBN No. 2-553-01403-1). Thus by temporarily installing such equipment at appropriate points at a high voltage transmission line's sending substation and/or its receiving substation, the imbalance may be acceptable as a temporary measure. This will permit removal of the conductor used on the disconnected phase or the grounding of that conductor, thereby allowing residual current to flow in it but allowing it's grounding so as to allow safe construction work in close proximity to it.

Figure 3:
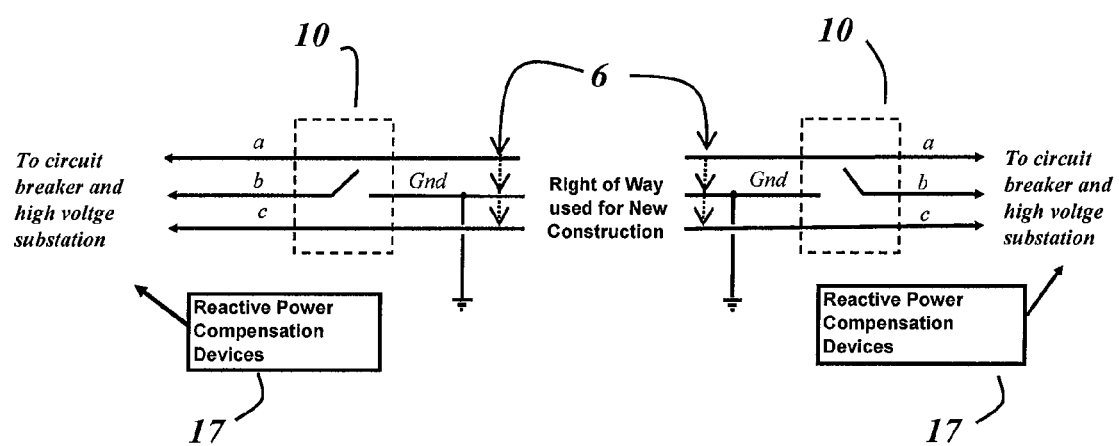
FIG. 3 Schematic showing a grounded phase position achieved by two, rather than three-phase operation of the transmission line.

FIG. 3 is a general schematic of such a scheme where, in this case, the disconnect switch 10 used for the center "b" conductor 6, is left in the open position while those for phases a and c are closed. Temporary reactive compensation equipment 17 is connected to appropriate points within the either or both substations to mitigate the imbalance caused by the opening of phase b. The same equipment may be used to support the voltage at both ends of the line, thus assuring that the two remaining phases are maximally effective in transferring power.

Second Example Embodiment: Conversion to Corner-Grounded Delta Ac Power

Figure 4:
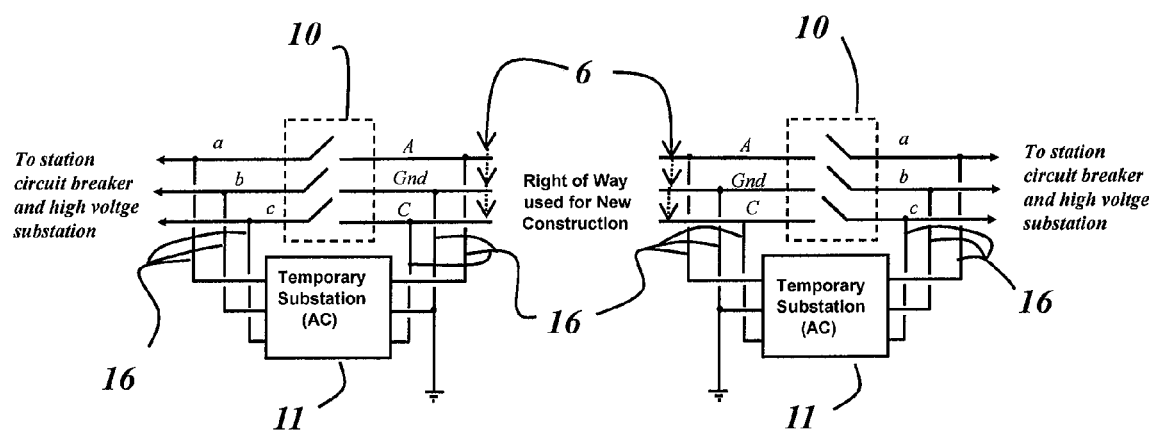
FIG. 4 Schematic showing the use of a temporary substation to convert the form of electric power transmission to a "grounded Y" form.

FIG. 4 shows a general electrical schematic wherein three phase power from the terminal substation of the electric transmission line whose right of way is to be used for new construction is first diverted through a temporary substation 11 that uses equipment and electrical principles known in the art and then connected to the terminals of the latter line. This would be achieved by leaving the disconnect switch 10, normally connecting the permanent substation to the transmission line, in an open position and using jumpers or temporary bus work 16 to bypass that switch 10. While FIG. 4 shows the b phase position grounded on the line-side of the temporary ac substation 11, it is apparent that any one of the three line-side phase positions could be selected as the grounded phase position.

The substation 11 is designated as "temporary" inasmuch as its transportability from one project such as is described herein to another would greatly reduce the cost of reconstruction projects, but transportability is not necessary to the invention.

Insertion of two temporary substations in series with the flow of power over the line may inhibit the flow of power over that line unless the temporary substation includes series capacitors or provisions for phase shifting (both known in the art) to assure that full power flows.

Figure 5A:
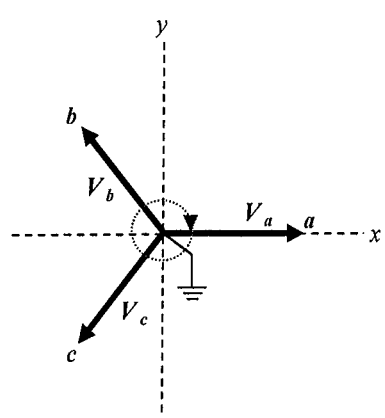
FIGS. 5*a* and 5*b* Phasor diagrams showing the voltages achieved by "grounded Y" operation.

To illustrate the means by which ac power can be converted by a temporary substation to a form capable of having one phase position grounded it will be helpful to review the fundamental "phasor" diagrams commonly used to interpret the three phase voltages used in electric power systems. Phasors are merely mathematical artifices that help interpret actual voltages occurring on the system. Phasors are assumed to have a fixed magnitude but to rotate about a central point. FIG. 5a shows three such phasors, offset from one another by 120 electrical degrees and representing phases a, b, and c. As each phasor rotates, its projection on the x axis, is the actual instantaneous voltage (positive or negative) on that phase. The voltage will be a sinusoidal wave having a frequency of either 50 or 60 cycles per second (Hertz). At any given time the sum of the three phase voltages is zero. Since current in the three phases is generally proportional to voltages, the sum of the three phase currents is also zero.

In almost all power systems the center point of the "Y" system of FIG. 5a is connected to ground. Transformers which step voltage up or down while retaining the form shown in FIG. 5a are referred to as Y-Y connections.

Figure 5B:
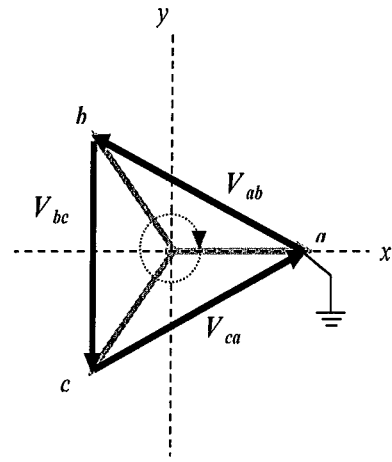

FIG. 5b shows the same configuration as FIG. 5a but also shows the voltage which one would find between phase positions, i.e. the voltage between a and b, ($V_{ab}$), between b and c, ($V_{bc}$), and between c and a, ($V_{ca}$). In a symmetrical three-phase system those "phase-to-phase" voltages are larger by $\sqrt{3}$ a than the phase-to-ground voltages. Line-to-ground voltage is of primary concern when assuring adequate insulation between a live conductor and a grounded support structure while line-to-line voltage determines the need for adequate spacing of one conductor from another.

It is possible to connect transformers so that one set of windings (e.g. the "primary" winding) is the common grounded Y configuration shown in FIG. 5a, but another (e.g. the "secondary" windings) is connected end to end to form a delta ($\Delta$). If both ends of a line are connected to delta configured windings the voltage of each conductor to ground is indeterminate unless special measures are taken to establish it in the center of the delta configuration. A "corner" of the delta may be grounded as shown in FIG. 5b. That does not alter the effectiveness of the voltage array, but it does elevate phase b and phase c to a higher potential above ground (higher by $\sqrt{3}$) than was the case where the center of the phasor array is made to be at ground potential.

Figure 1:
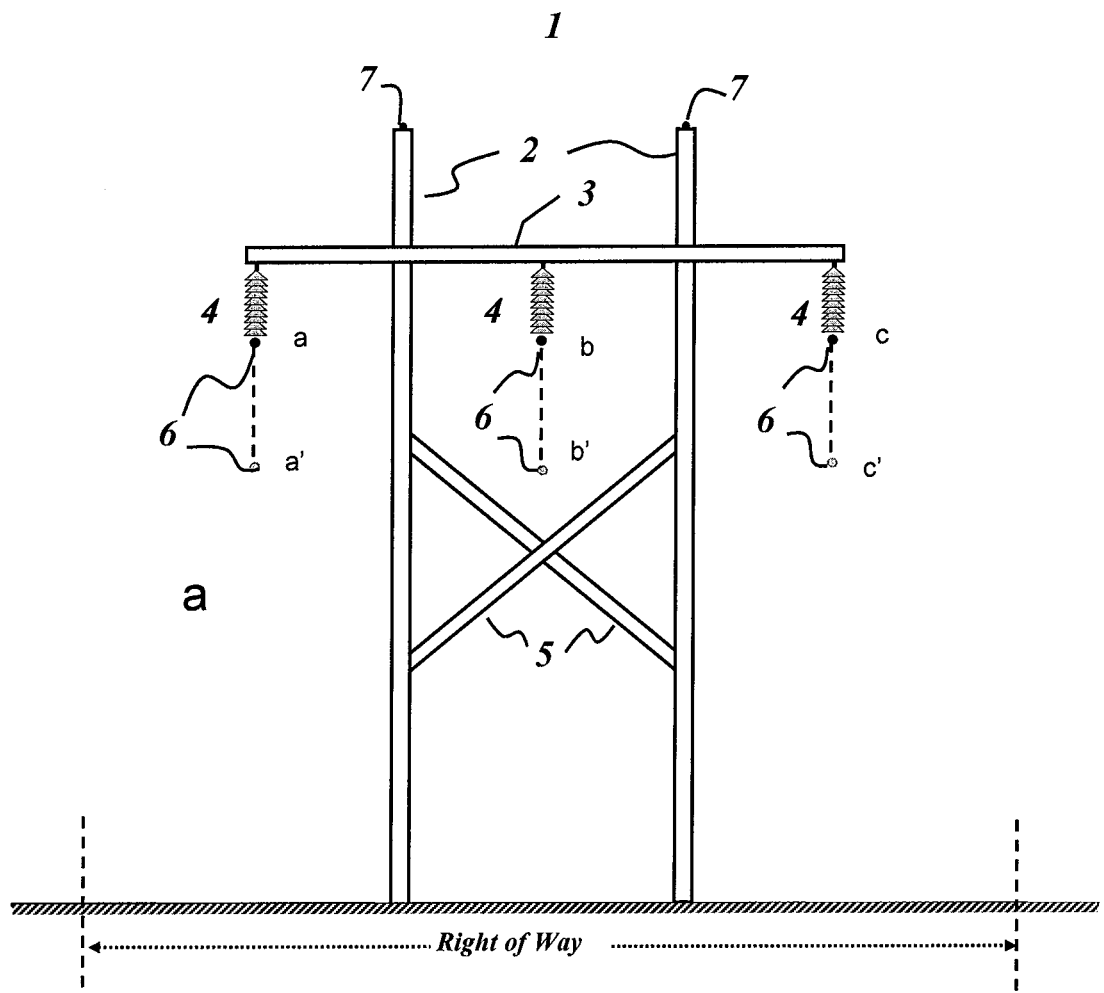
FIG. 1 A typical prior-art high voltage transmission "H-frame" structure.
Figure 2:
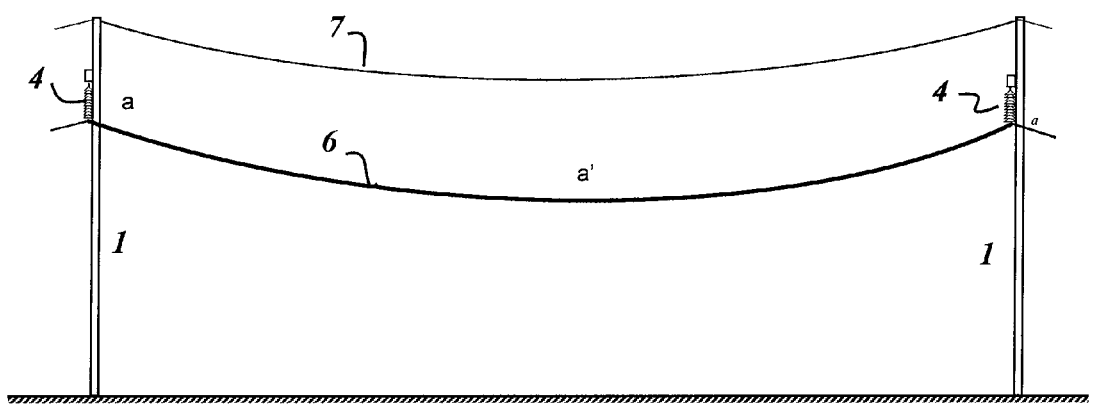
FIG. 2 Longitudinal profile of a typical existing high voltage transmission line.

If the transmission line of FIG. 1 is made to operate as a delta configuration with one phase position grounded, the ac capability of the circuit remains unchanged and construction work can be undertaken in close proximity to that phase position.

Feasibility of the foregoing hinges on (a) the ability of existing line insulation to sustain a higher voltage between conductors and the structure and between the conductor and earth than was the case prior to conversion to the corner grounded delta system, (b) designing the Y-$\Delta$ transformers to step the $\Delta$ side voltage down to a lower level, sustaining high power flow by simultaneously causing one of the two transformers to include a "phase shifting" feature to encourage flow and/or inserting series capacitive compensation to reduce the effective reactance of the line or (c) a combination of (a) and (b). Many transmission lines are capable of temporary operation at a voltage well in excess of their nominal voltage, particularly if modern surge arresters are used to limit surge overvoltages and are included in the temporary substation. Where they are not, addition of more insulators is another option.

Third Example Embodiment: Conversion to Bipolar Dc

Figure 6:
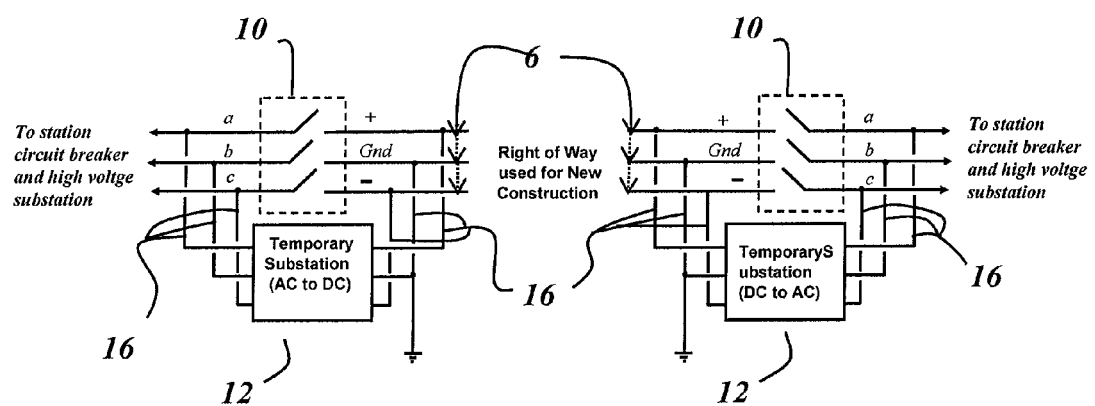
FIG. 6 Schematic showing the use of a temporary converter substation to convert the form of electric transmission to two-pole high voltage dc.

Conversion of high voltage ac to high voltage dc at one end of a line and back to ac at another is now common practice in special transmission applications all over the world. While no such converter stations have been built to be transportable, there is no reason, in principle, that they could not be constructed in the same manner as temporary ac substations; for example ac to dc conversion schemes which do not require a transformer (see U.S. Pat. No. 5,414,612 "HVDC transmission with a converter connected between an AC voltage and a DC link common to the converters", Bjorklund et al.). FIG. 6 shows a temporary substation 12 connected in the same general manner as was discussed for the ac substation of FIG. 5 but in this case equipped to convert alternating current to direct current and back again.

Bipolar dc transmission requires only two conductor positions; one positive and one negative, thus freeing up the third phase position to serve as an electrical ground. DC has several advantages over ac in the embodiment of this invention:

i. It permits transmission of substantially the same amount of power without increasing the maximum voltage to ground and ii. It permits independent control of the level of power transmitted, thereby assuring full use of the capability of the conductors in place on the transmission line being converted.

The second broad step of the inventive method is to move the remaining live conductors away from the grounded conductor such that sufficient safe work space is achieved at the location at which new support structure is to be erected. Several means of moving live conductors and maintaining them in the moved locations are described, although the invention is not limited to these specific embodiments.

Work Space Achieved by Grounding of an Outside Phase Position Using Embodiments 1, 2, or 3

Figure 7:
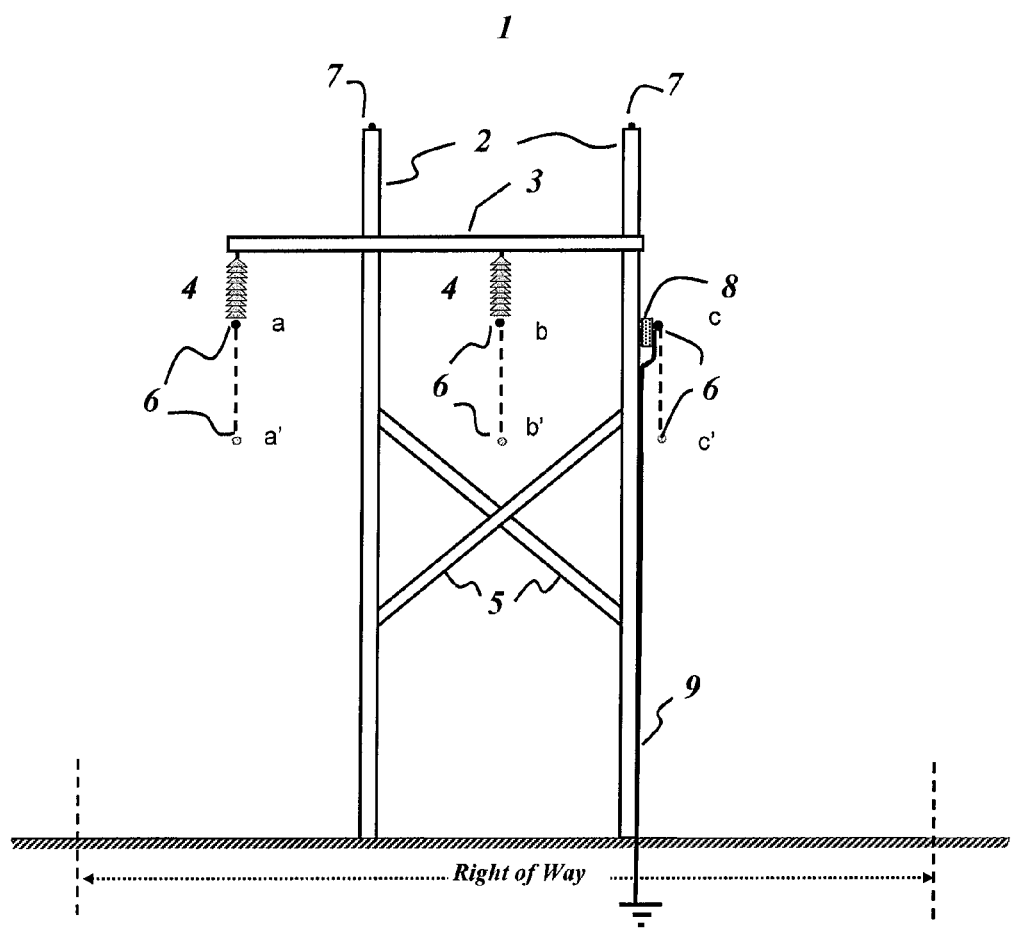
FIG. 7 An "H-frame" high voltage transmission structure with phase position c grounded; its insulators removed.

FIG. 7 shows the structure of FIG. 1 with phase position c operating at ground potential. In this embodiment the position c conductor 6 is no longer supported by an insulator 4 but, being at ground potential, has been attached directly to the pole 2 by means of a special clamp 8 of a type known in the art. A ground lead 9 attaches the grounded conductor 6 of phase position c directly to ground. This local ground point, in addition to that normally supplied at the temporary substation 17 of FIG. 3, 11 of FIG. 4 or 12 of FIG. 5 gives added safety to workmen in proximity to the structures on either side of the construction site. As an option, the right hand portion of the cross arm 3 can be removed, as illustrated in FIG. 7.

Figure 8:
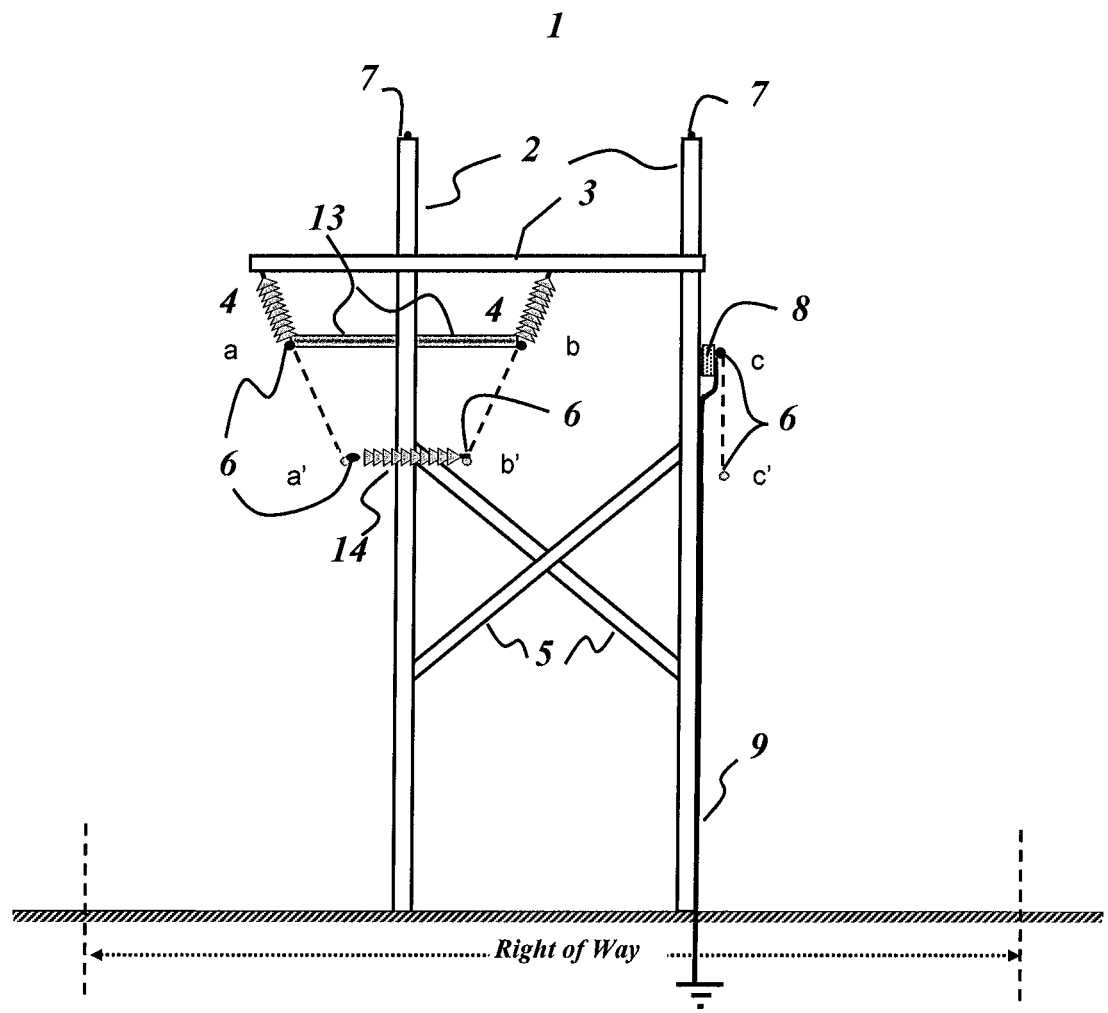
FIG. 8 An "H-frame" high voltage transmission structure with phases b and c drawn together at the structure by use of "hot sticks" and at midspan by use of an inter-phase insulator.

To increase the work space at the middle of the span, phase positions (or poles in the case of dc conversion) a and b can be drawn together as shown in FIG. 8. Two measures can be taken to achieve this displacement:

Insulated "hot sticks" 13, shown in FIG. 8 are commonly used in live-line maintenance of high voltage transmission lines, either to do mechanical work on line hardware from a remote point or to temporarily suspend a conductor while its supporting insulators are replaced. In FIG. 8 they are used to draw conductors 6 on phases a and b towards one another at their respective points of suspension from the supporting structure. Additionally, at the midspan point the conductors 6 comprising phase positions a and b (labeled a' and b' at midspan in FIG. 8) may be drawn together by inter-phase insulator 14.

Figure 9:
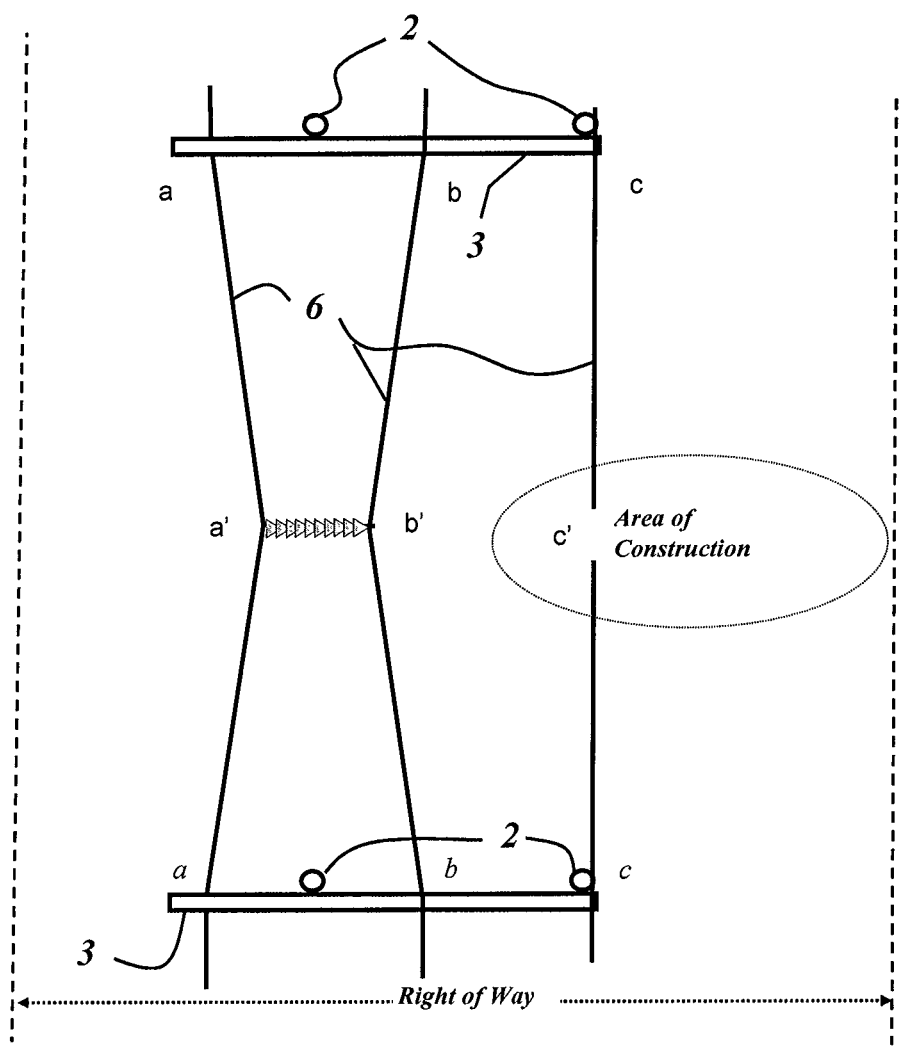
FIG. 9 Plan view of the phase spacing reduction achieved by the means illustrated in FIG. 8.
Figure 10:
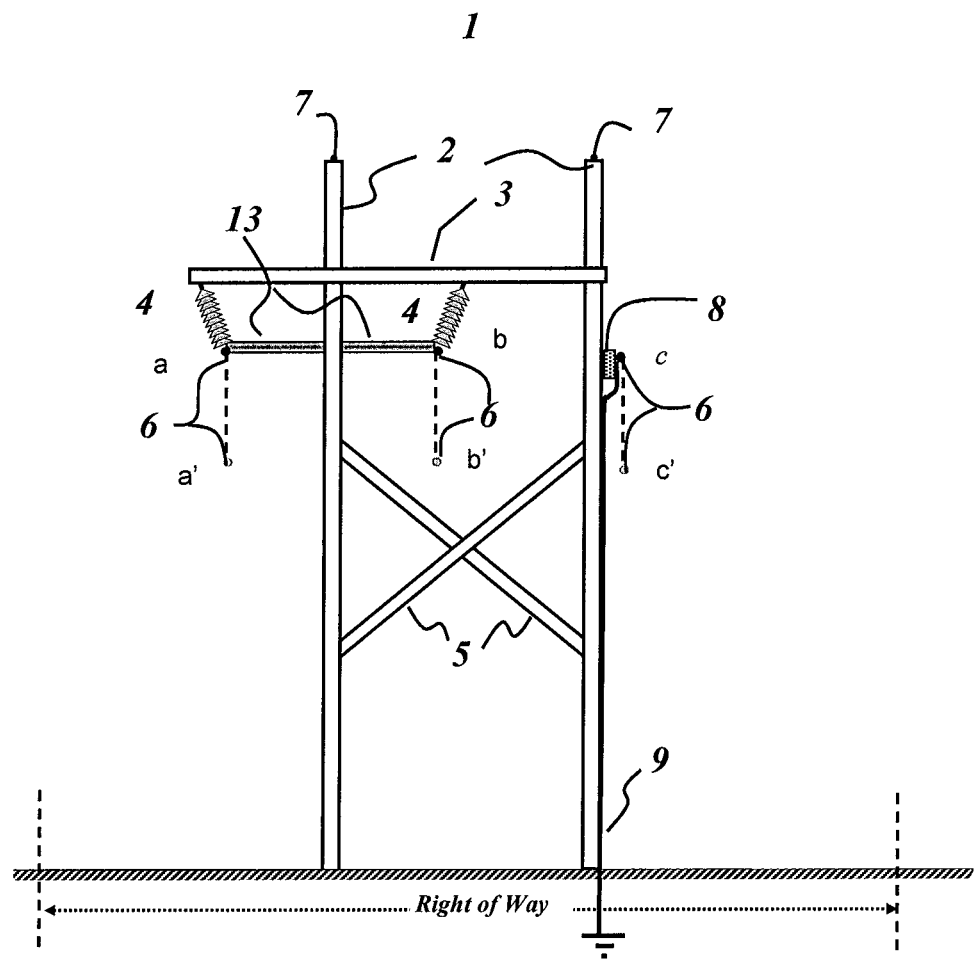
FIG. 10 The "H frame" high voltage transmission structure of FIG. 9 with midspan interphase insulator removed.

FIG. 9 shows the result, in a plan view, of the measures described above and illustrated in FIG. 8. FIG. 9 also shows the general work area ("Area of Construction") created by the electrical and mechanical steps outlined above. Once a structure has been erected in the area of construction shown in FIG. 9, it may be desirable to remove the midspan insulator since an accumulation of insulators of that type on a number of spans will increase conductor tension. FIG. 10 shows a cross-section of the H frame structure 1 with midspan insulator 14 removed but with hot sticks 13 still in place to reduce proximity of conductor 6 to a structure erected close to phase position c.

Work Space Achieved by Grounding the Center Phase Position Using Embodiments 1, 2, or 3

Figure 11:
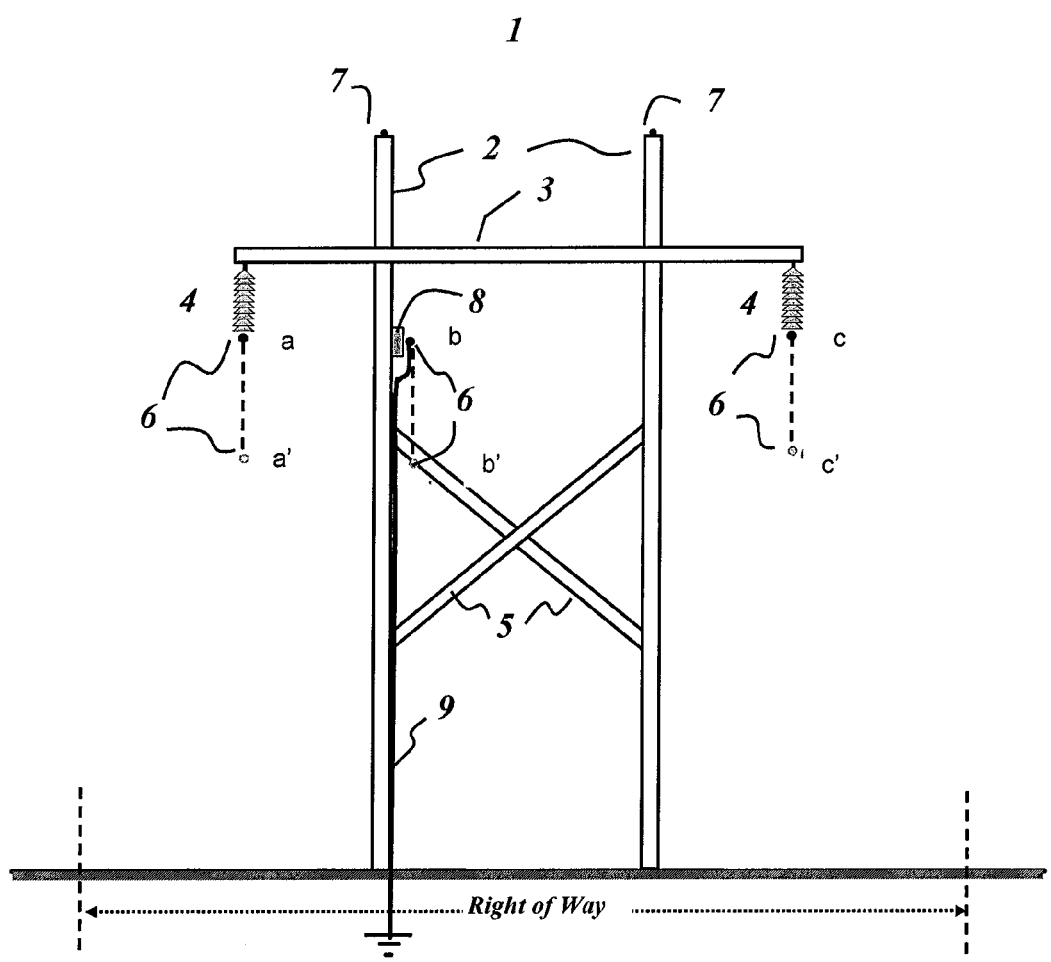
FIG. 11 An "H-frame" high voltage transmission structure with the center phase position b grounded; its insulators removed.

Grounding of the center phase positions will allow the circuit(s) supported by the newly constructed line to take maximum advantage of the right of way by being in its center. FIG. 11 shows the H-frame structure 1 with the center phase position, b, operating at ground potential. Once again the conductor 6 used on phase position b has been removed from its suspension insulator 4 and attached directly to the pole 2 by means of clamp 8. A ground lead 9 again assures that the conductor will always be at ground potential at the work area.

Figure 12:
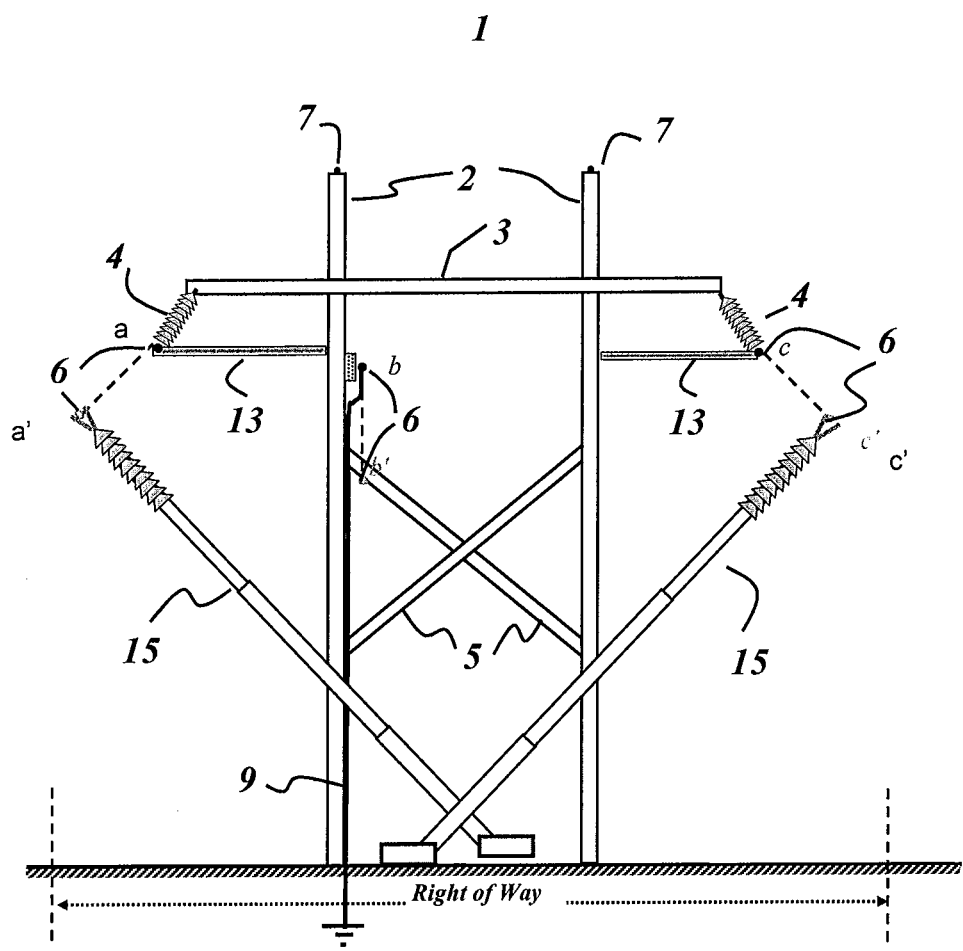
FIG. 12 The "H-frame" high voltage transmission structure of FIG. 11 with phases a and b spread outward at the structure by hot sticks and at midspan by extendable insulated props.

With the center phase position grounded, work area will be increased by moving phases a and c (a' and c' at midspan) as far outward to either side as possible. FIG. 12 shows hot sticks 13 used to push the two outer phase positions further outward at the structure. In this case the hot sticks would be mechanically loaded in compression and may therefore have to be substituted for by stand-off insulators of a type known in the art.

Figure 13:
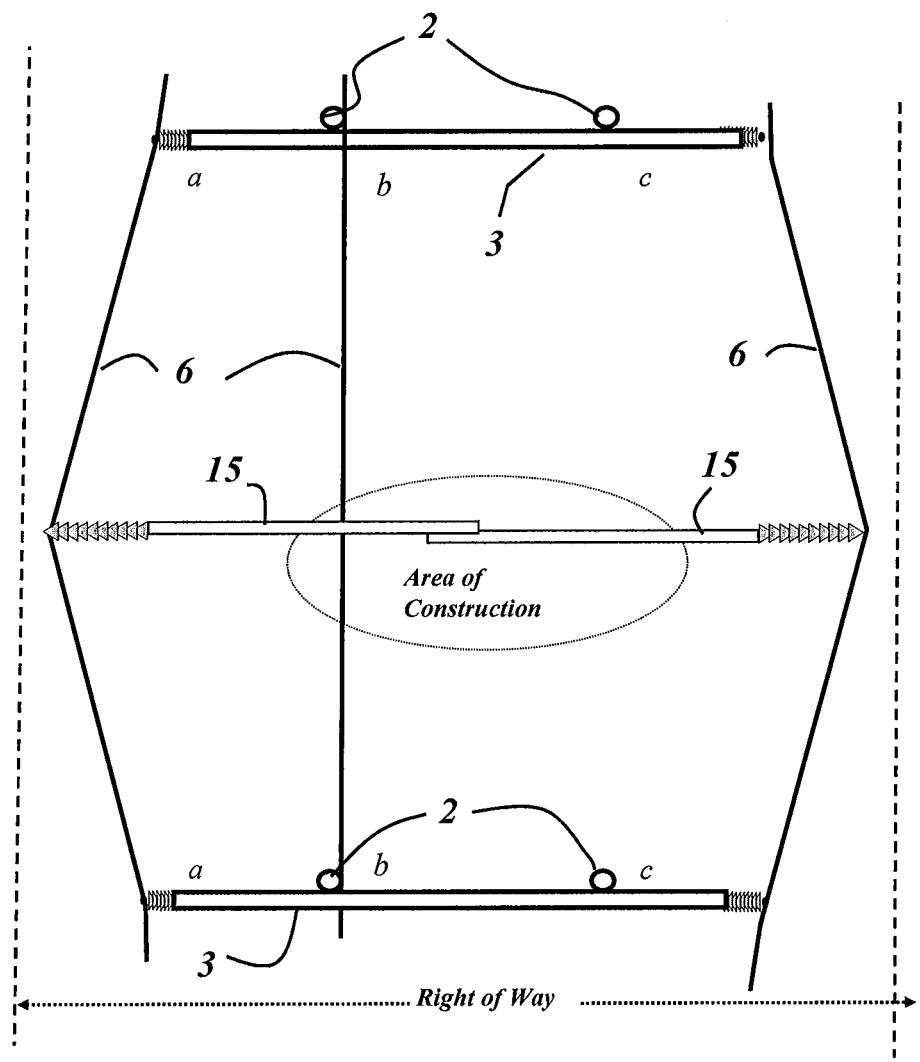
FIG. 13 Plan view of the phase spacing increase achieved by the measures illustrated in FIG. 12.

In addition to the outward positioning achieved by the hot sticks or stand-off insulators 13 in FIG. 12, the figure shows an extendable insulated prop 15, supported from ground and positioned so as to exert both an upward (lifting) force and an outward force on conductors 6 of phases a and c at or near the midspan point (a' and c'). The upward component of force will reduce tension on the conductors while the outward component will increase tension. Optimal positioning of insulated prop 15 will allow considerable outward displacement of phase positions a' and c' without changing tension and, as a consequence, the amount of sag on adjacent spans. The latter is important to maintain safe clearance between the conductors and the earth. FIG. 13 shows a plan view of a span with structures on either end configured according to FIG. 12, with the safe work area shown.

While it would be possible to push phases a and c away from one another with an inter-phase insulator 14 such as was shown in FIG. 8, that insulator would be extremely long and, in this case, subject to compression rather than tension loading.

Figure 14:
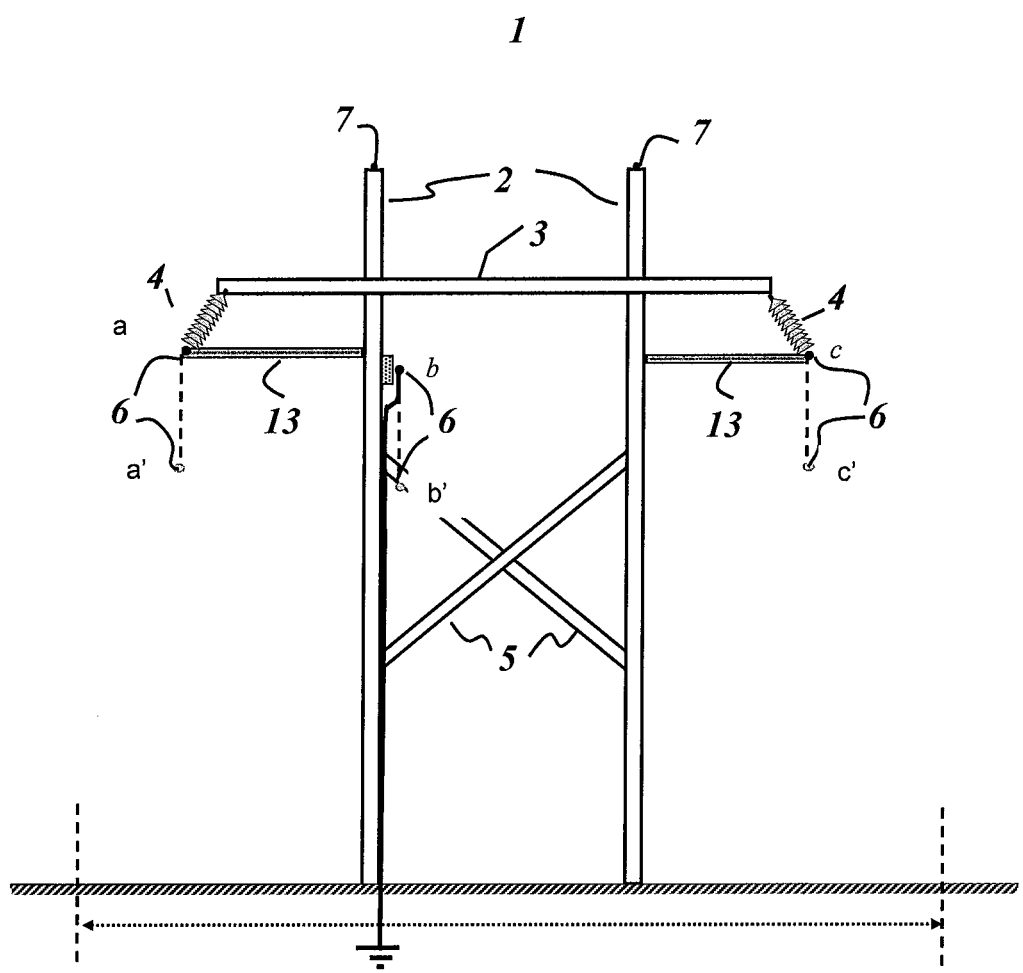
FIG. 14 The "H-frame" high voltage transmission structure of FIG. 12 with the extendable insulated props removed.

As with the prior embodiment, it will desirable that a portion of the excess separation of phase positions a and c be retained after a new structure has been erected at or near the midpoint of a span. FIG. 14 shows such a configuration with the insulated extendable props removed but hot sticks or stand-off insulators 13 remaining in place to achieve separation.

Phase Positioning Devices

Figure 15:
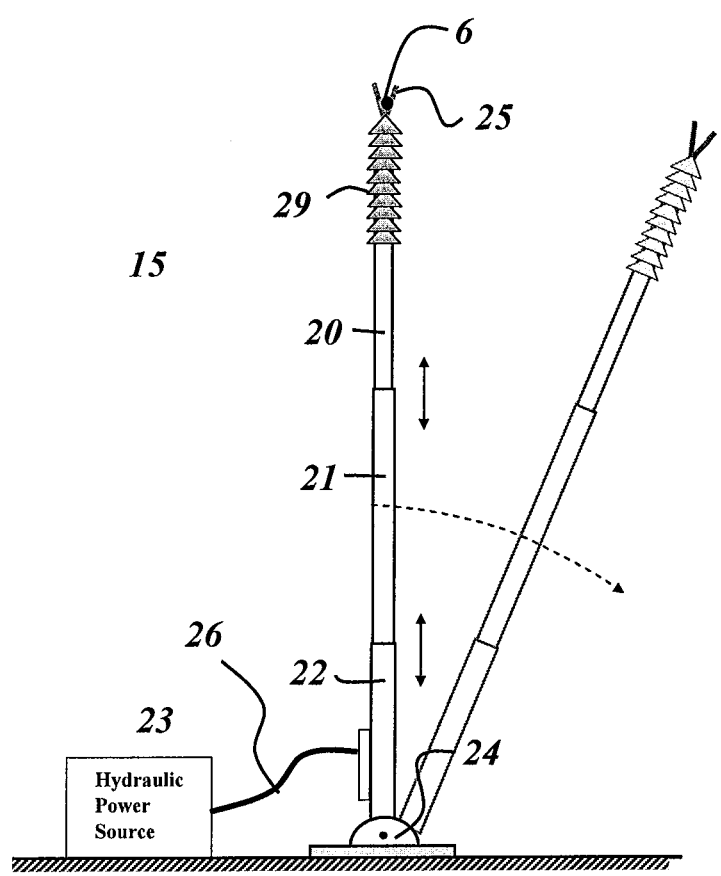
FIG. 15 An extendable insulated prop with hydraulic pressure supply for use in the invention.

FIG. 15 shows a simplified schematic diagram of the insulated prop 15 shown functionally in FIG. 12. It is comprised of a series of telescoping boom members 20, 21, and 22, atop which is mounted a rigid insulator 29 capable of sustaining line-to-ground voltage of the line being worked on. On top of the insulator a conductor capture device 25 is shown. Its purpose is to allow the prop 15 to capture and retain mechanical contact with the conductor 6 as the telescoping boom members 20, 21, and 22 are extended to reposition the conductor 6 at midspan. The capture device 25 is preferably essentially V-shaped and comprised of or lined by high friction material capable of holding the conductor without physical clamping. Other capture device constructions are contemplated.

The lateral position of the prop base and its angle of approach to the conductor are adjusted based on the sag profile of the conductor 6 being moved. The prop base 24 would therefore have to (a) be adjustable in angle and (b) designed to maintain its fixed base point as it exerts upward and outward pressure on the conductor. A variety of existing base designs can achieve those objectives.

Several means may be used to extend the prop 15, including but not limited to gearing systems and hydraulic pistons, all of which are known in the art and the latter being the most likely to be reliable and economic. FIG. 15 shows a source of hydraulic pressure 23 in close proximity to the prop. The mechanical design of the prop extension pistons must be fail-safe in the sense that once adjusted, the prop length must remain unchanged until deliberately released, even in the event of hydraulic pressure failure.

Figure 16:
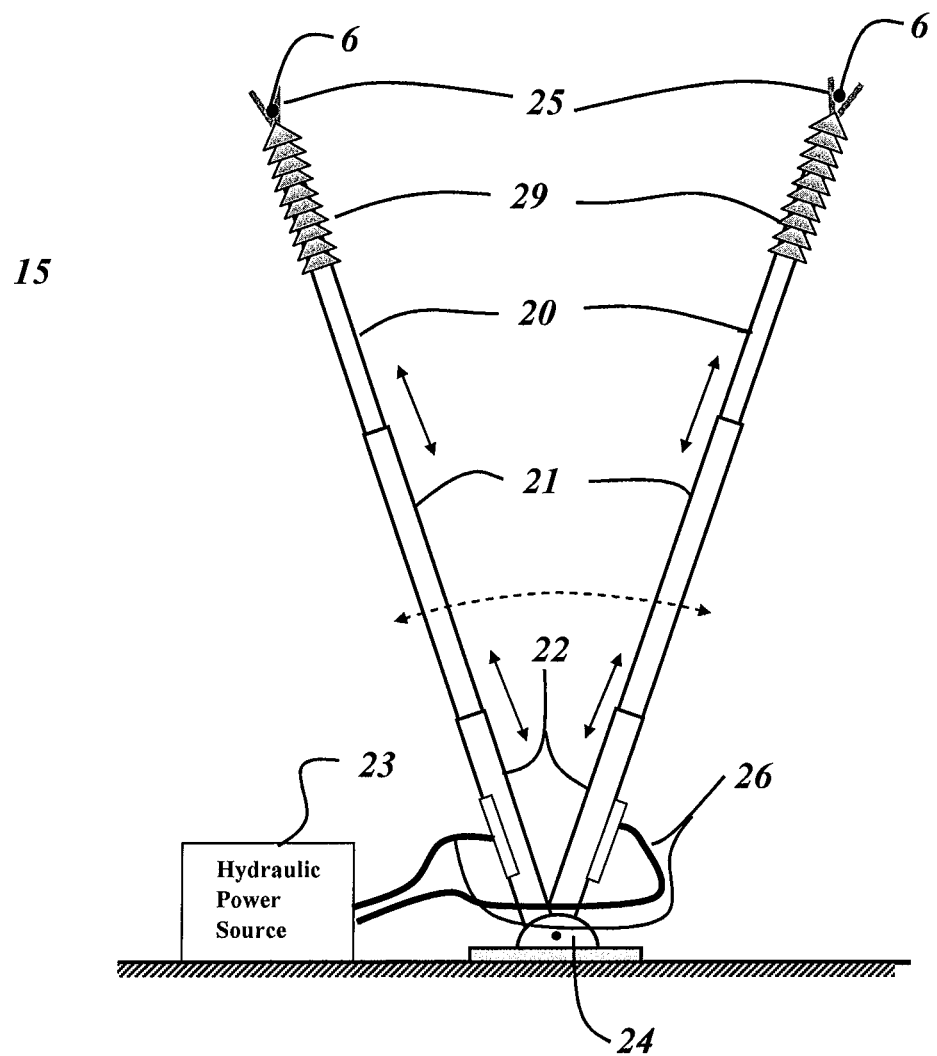
FIG. 16 A dual embodiment of the extendable insulated prop shown in FIG. 15.

FIG. 16 shows another embodiment of the prop taking advantage of the fact that two props will generally be needed and will exert equal and opposite lateral force on the prop base. The convenience of combining props may however be offset by loss of the advantage that the single prop design (FIG. 15) gives in allowing independent positioning of the base 24 of each such prop used.

Figure 17:
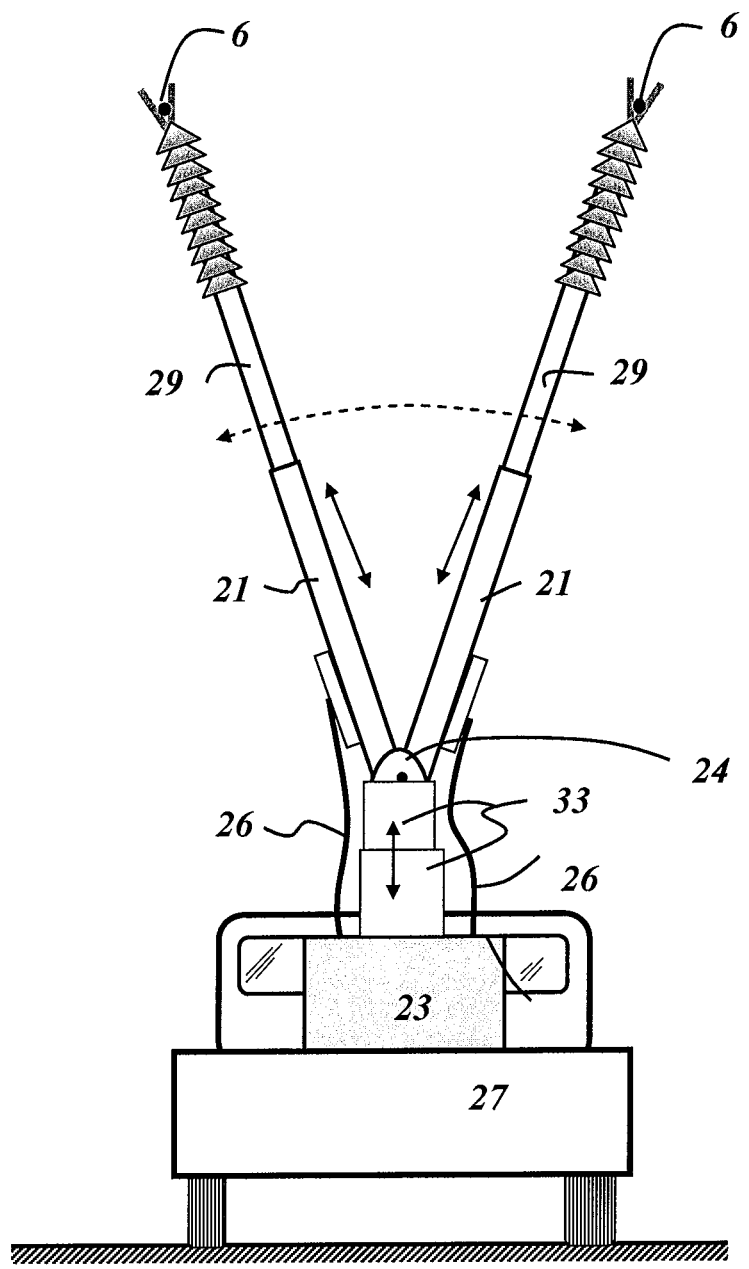
FIG. 17 A vehicle-mounted embodiment of the dual extendable insulated prop illustrated in FIG. 16.

Other means of mounting or aggregating props may increase the efficiency of the phase separation operation, including mounting on a vehicle 27 as shown in FIG. 17. The vertical extendable boom 33 in FIG. 17, combined with the extendable boom sections 21 and 29 permit independent adjustment of vertical and horizontal force on conductors 6, thereby achieving optimal lateral displacement without affecting sag on adjacent spans.

Figure 18:
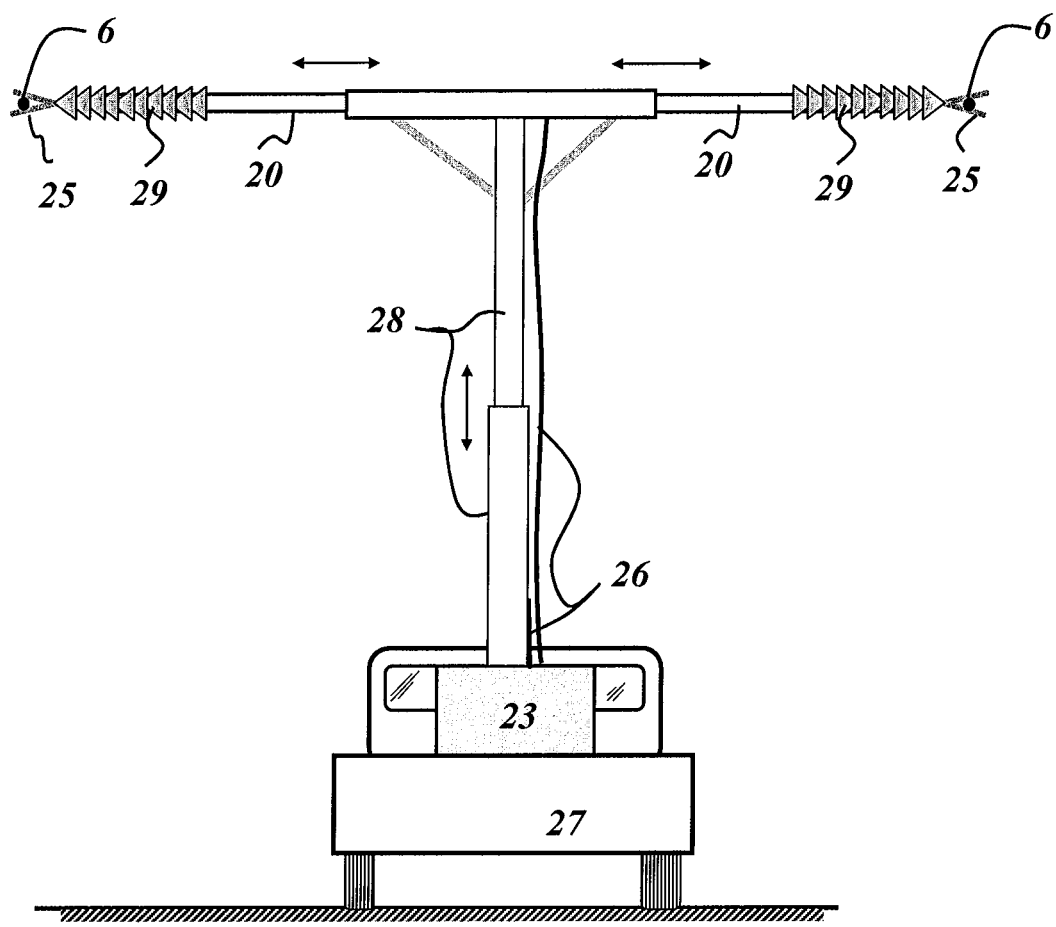
FIG. 18 A vehicle-mounted horizontal ("spreader") embodiment of the extendable insulated prop of FIG. 15.

An alternative, horizontal embodiment of the vehicle-mounted device is shown in FIG. 18. In this case the extendable "phase spreader" substitutes for the prop shown in prior figures. In the embodiment illustrated in FIG. 18 the telescoping arms 20 move horizontally and apart from one another.

Structure Erection in Close Proximity to Energized Phases or Poles

Figure 19:
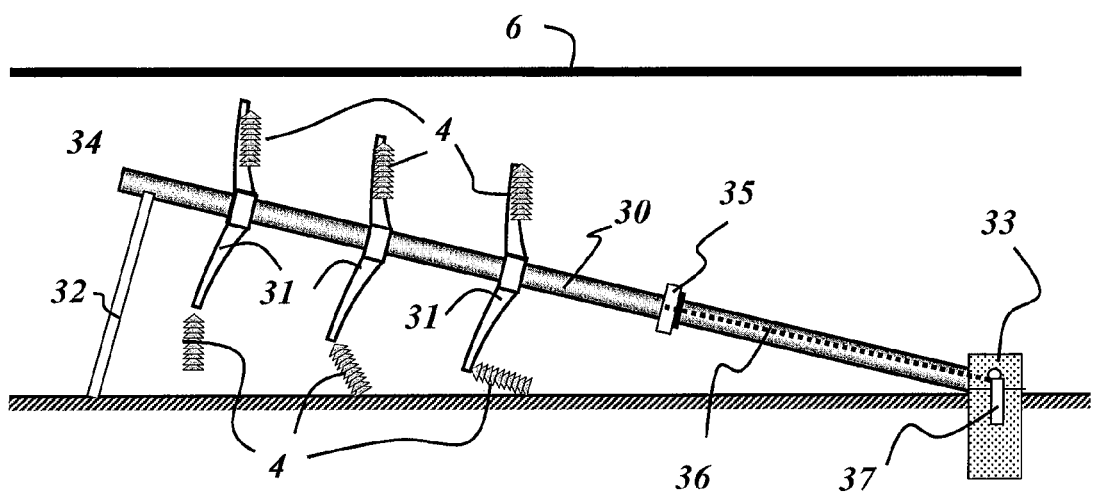
FIG. 19 An example double circuit structure assembled, complete with cross arms and insulators, at ground level; the cross arms in a plane parallel to the axis of the right of way.

The simplest embodiment of this invention would be to bring pre-assembled transmission support structures to the right of way by helicopter, lowering them into place onto permanent footings. An alternative embodiment would be to complete the new structure, including cross-arms 31 and insulators 4, on the ground at the point where it is to be erected. FIG. 19 shows an example double-circuit structure 34 completed on site, and supported by a temporary brace 32. In FIG. 19 the cross arms 31 are oriented in a vertical plane parallel to the right of way so that structure 34 occupies a minimal lateral extent of the construction area, to maintain necessary separation from the live conductors. The structure is mechanically tied to a special footing 33 which allows the structure to be lifted to a vertical position, supported laterally by two temporary guy wires 36 tied at their upper end to a swivel collar 35 and at their lower end to ground anchors 37.

Figure 20:
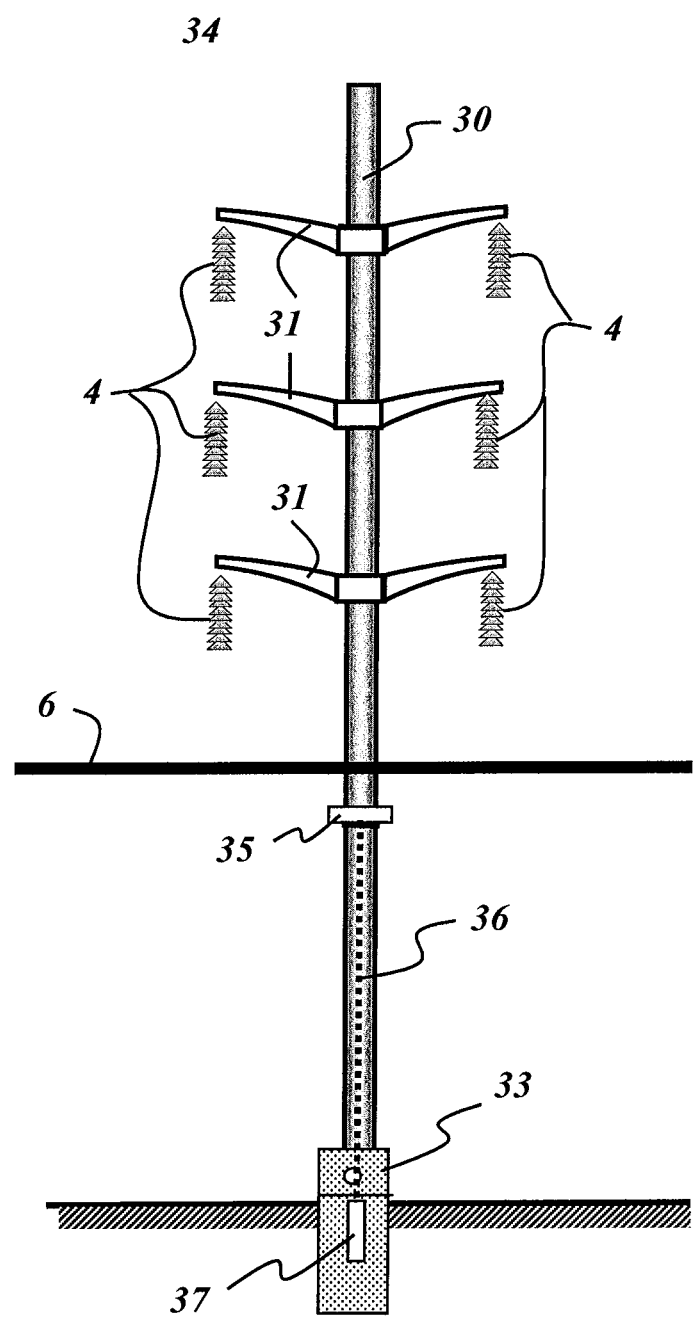
FIG. 20 The example structure of FIG. 19 erected but with cross arms still in a plane parallel to the axis of the right of way.
Figure 21:
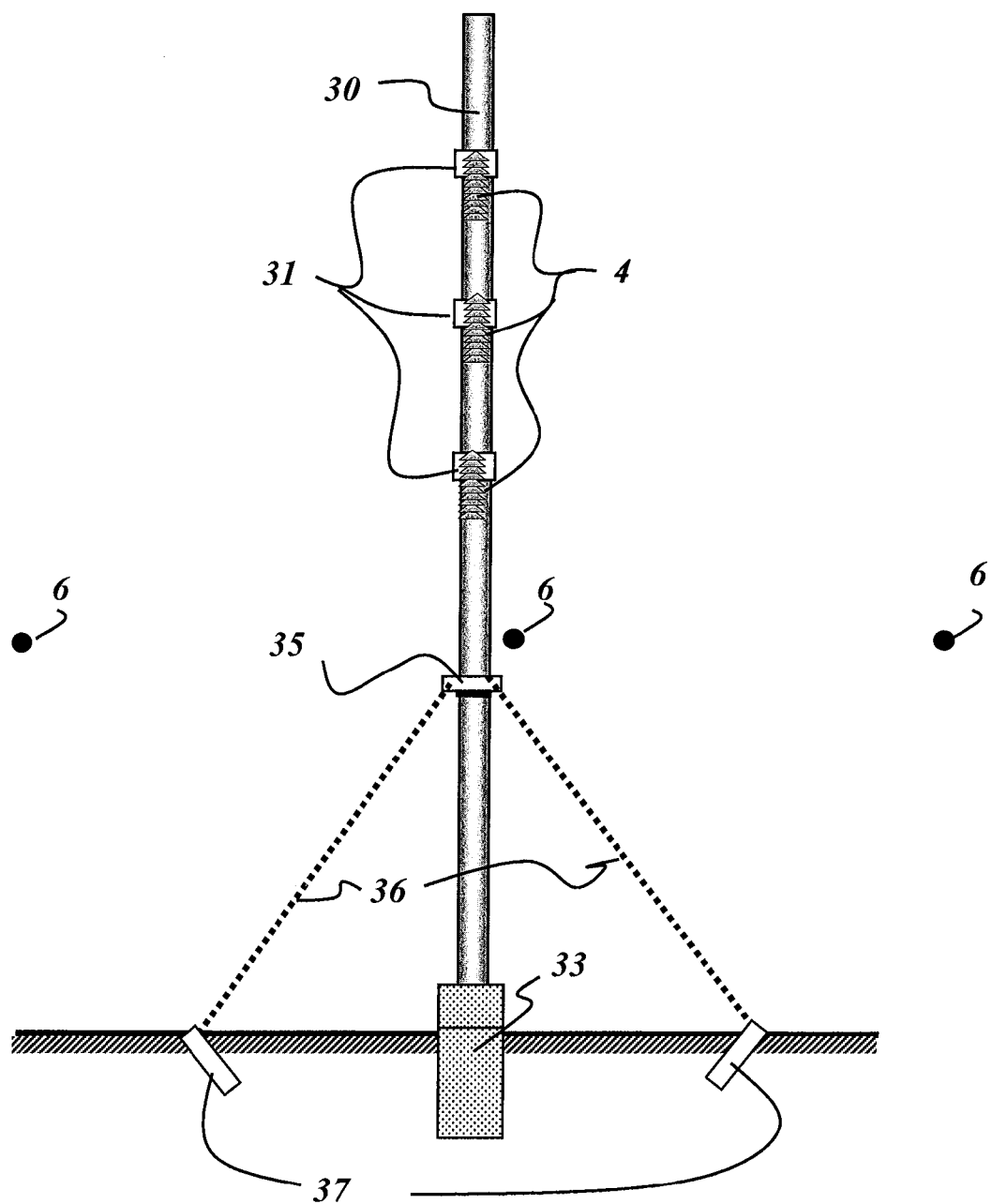
FIG. 21 The example structure illustrated by FIG. 20 viewed in a plane transverse to the axis of the right of way.

In FIG. 20 the tower has been erected to a vertical position by one of several methods, including use of a gin pole, winch, and restraining cable (all existing devices, not shown in the drawing). The cross arms remain in a plane parallel to the right of way. FIG. 21 is the same as FIG. 20 except viewed in a plane transverse to the right of way.

Figure 22:
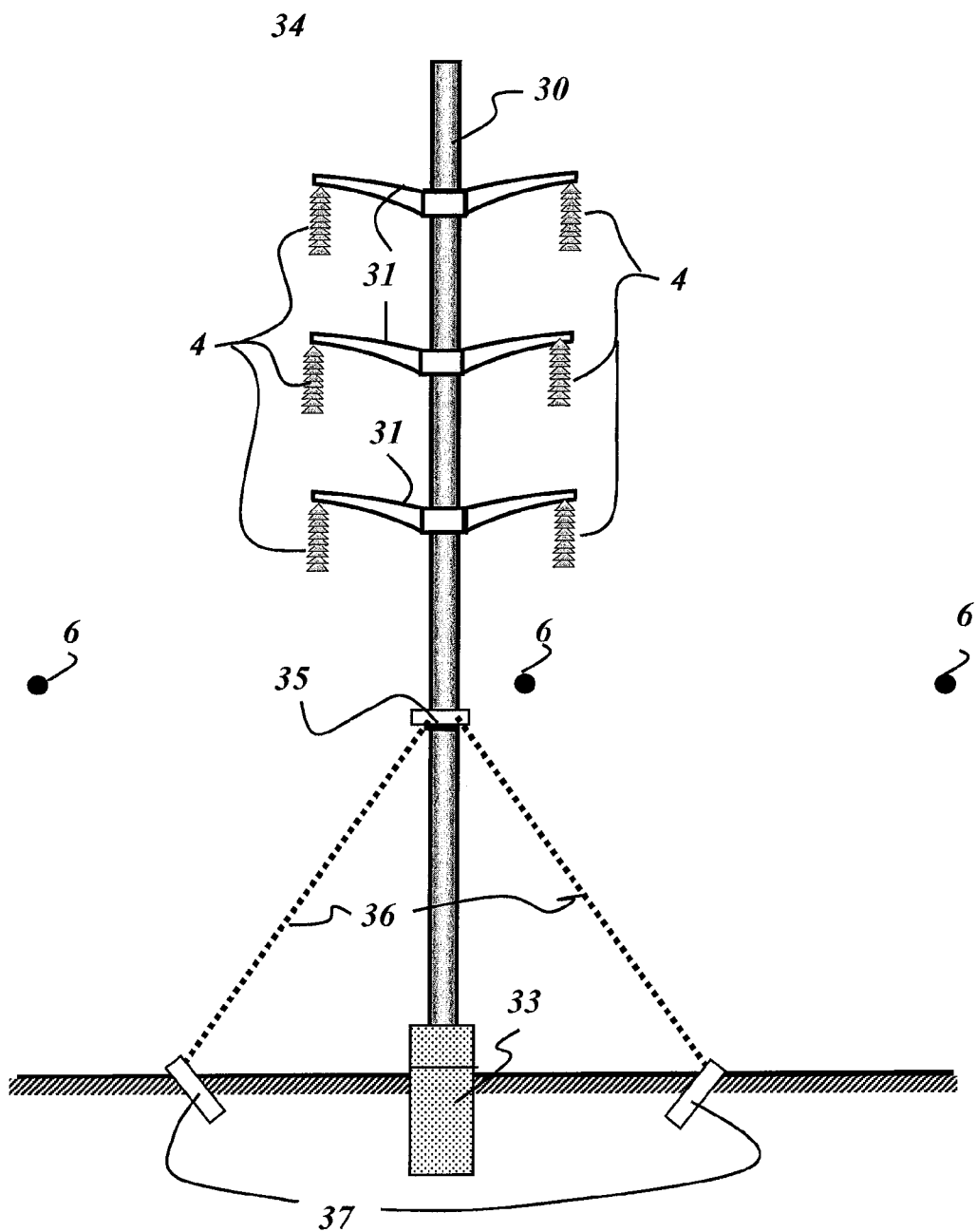
FIG. 22. The example structure illustrated by FIG. 21 but with the structure and/or its cross arms.

In FIG. 22 the entire new structure 34 has been rotated 90 degrees into its permanent position with the cross arms in a plane transverse to that of the right of way.

In yet another embodiment the cross arms 31 themselves can be rotated while the pole to which they are attached 30 remains stationary.

Conductor Installation on New Structures

New conductors are normally pulled into place by installing temporary blocks at the base of each insulator assembly, threading a small lead cable through those blocks, then using the lead cable to pull the permanent conductor into place. Depending on the dimensions of both the old transmission line and the replacement structure, it will be possible in some cases to string lead cables from each new structure to the next so that once the new structures are erected the conductors for the new transmission line can be pulled into place while the existing transmission line continues to operate. This process is made more feasible by having a longitudinal zone under which no live conductors operate. Even in cases where this is not possible, the procedures and apparatus constituting this invention will minimize the down-time needed for transfer of service from the old transmission line to the new and dismantling of the old.

With respect to the above description then, it is to be realized that the optimum relationships for the elements of the invention, to include variations in size, materials, shape, form, function and manner of operation, assembly and use, are deemed apparent to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will occur to those skilled in the art, it is not desired to limit the invention to the exact construction and operation shown and described, and accordingly, all suitable modifications and equivalents may be resorted to, falling within the scope of the invention.

What is claimed is:

1. A method for creating working space within the right of way occupied by an existing three phase high voltage transmission line comprised of three phases, each phase comprised of one or more conductive cables, by removing one of the three phases from service and enabling the remaining two active phases to carry the power previously carried by three active phases, the method comprising:

installing a temporary, transportable substation at each terminal of the transmission line, to provide for the control of the mode of power transmission over the transmission line, wherein the temporary, transportable substations are each electrically coupled to first and second transmission line phases, and serve to change the mode of transmission between the substations from three phase alternating current to two-pole direct current, wherein one substation comprises an ac-to-dc converter station and the other comprises a dc-to-ac converter station, thus allowing the first and second transmission line phases to transmit power while the third phase is removed, replaced, or grounded;

removing the voltage applied to the third transmission line phase; and continuing to transmit power on the first and second transmission line phases, to allow work to be conducted on or proximate to the third transmission line phase while power is still carried along the right of way.

2. The method of claim 1 further comprising mitigating the imbalance in the two phases that continue to transmit ac power by the use of electrical devices electrically coupled to those two phases.

3. The method of claim 1 further comprising adjusting the ac power flow on the two phases of the existing transmission line that remain in service via the use of electrical devices.

4. The method of claim 1 further comprising moving the conductors of the remaining two phases laterally.

5. The method of claim 4 in which moving the conductors of the remaining phases laterally is accomplished at or near the midpoint between support structures to allow space for new transmission line support structures.

6. The method of claim 5 in which lateral displacement is achieved by the separate or combined use of hot sticks, insulators, and extendable insulated props, thus increasing the available space for the new structures.

7. The method of claim 6 in which the clearance between live conductors suspended from existing structures and newly erected structures is maintained by leaving in place hot sticks or insulators used for lateral displacement of live conductors at each existing structure until the high voltage transmission line supported by new structures is commissioned and the existing structures are taken out of service.

8. The method of claim 5 in which lateral displacement is achieved using an extendable insulated prop or system of props capable of lifting existing conductors at or near the midpoint between existing support structures and exerting lateral force sufficient to move them away from a work area.

9. The method of claim 8 in which the base point and length of the insulated prop are adjustable to maximize the lateral displacement of an existing conductor while respecting force constraints safe for the existing structure and while not affecting the sag on adjacent spans.

10. The method of claim 8 in which one or more insulated props are vehicle mounted.

11. The method of claim 8 in which the props hold overhead conductors without the need for clamps.

12. the method of claim 1 in which the work to be conducted on or proximate the third transmission line phase comprises installing new support structures and their associated conductors on the right of way while the first and second transmission line phases continue to operate.

\* \* \* \* \*